US006292935B1

(12) United States Patent
Lueh et al.

(10) Patent No.: US 6,292,935 B1
(45) Date of Patent: *Sep. 18, 2001

(54) METHOD FOR FAST TRANSLATION OF JAVA BYTE CODES INTO EFFICIENT NATIVE PROCESSOR CODE

(75) Inventors: Guei-Yuan Lueh; Ali-Reza Adl Tabatabai, both of Santa Clara, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/087,353

(22) Filed: May 29, 1998

(51) Int. Cl.$^7$ ........................................................ G06F 9/45
(52) U.S. Cl. ........................................ 717/5; 717/9; 717/7
(58) Field of Search ................................... 395/705, 707, 395/709, 800.36, 706; 717/5, 7, 9, 6; 712/36

(56) References Cited

U.S. PATENT DOCUMENTS

| | | | | |
|---|---|---|---|---|
| 5,598,560 | * | 1/1997 | Benson ......................... | 717/7 |
| 5,754,830 | * | 5/1998 | Butts et al. .................... | 709/311 |
| 5,794,049 | * | 8/1998 | Lindholm ....................... | 717/6 |
| 5,802,373 | * | 9/1998 | Yates et al. .................... | 717/5 |
| 5,805,895 | * | 2/1999 | Breternitz, Jr. et al. ......... | 717/9 |
| 5,875,336 | * | 2/1999 | Dickol et al. .................. | 717/5 |
| 5,898,885 | * | 4/1999 | Dickol et al. .................. | 712/36 |
| 6,075,942 | * | 6/2000 | Cartwright, Jr. ............... | 717/9 |
| 6,081,665 | * | 6/2000 | Nilsen et al. ................... | 717/5 |

OTHER PUBLICATIONS

Goodman–Miller, Programmer's View of Computer Architecture, Oxford University Press, 1993.*
James Gosling, et al., The Java Language Specification, Published by Addison–Wesley, 1996, pp. 29–49.
Tim Lindholm, et al., The Java Virtual Machine Specification, Published by Addison–Wesley, 1997, pp. 57–82.
Alfred V. Aho, et al., Compilers–Principles, Techniques, and Tools, Published by Addsion–Wesley, 1988, pp. 1–24.
Steven S. Muchnick, Advanced Compiler Design & Implementation, Published by Morgan Kaufmann, 1997, pp. 1–18, 319–328.
Douglas Kramer, The Java Platform–A White Paper, Published by Javasoft, 1996, pp. 6–24.

* cited by examiner

Primary Examiner—Mark R. Powell
Assistant Examiner—Hoang-Vu Antony Nguyen-Ba
(74) Attorney, Agent, or Firm—Blakely, Sokoloff, Taylor & Zafman LLP

(57) ABSTRACT

To efficient generate native processor code from operand stack based code, a mimic stack is introduced. The mimic stack is a compile time data structure that stores the location of operands pushed onto the operand stack. When an operation is detected that operates on operand stack values, the locations from the mimic stack are popped off and used to generate efficient code that directly accesses the operands.

63 Claims, 6 Drawing Sheets

| Step | Mimic Stack | Action | Code Generated |
|---|---|---|---|
| 0 | | Initial State | None |
| 1 | Var (X) | Push the location of variable X onto the mimic stack in response to iload_1 instruction. | None |
| 2 | Immediate(1) Var (X) | Push the constant value location onto the mimic stack in response to the iconst_1 instruction. | None |
| 3 | | Pop the two values on the top of the mimic stack and generate the code to add them, in response to the iadd instruction. | Move EAX, X Add EAX, Const1 |
| 4 | EAX | Push the location of the previous result onto the mimic stack. | None |
| 5 | ESI EAX | Push the location of variable Y onto the mimic stack in response to the iadd instruction. | None |
| 6 | | Pop the two values from the top of the mimic stack and generate code to add them, in response to the iadd instruction. | Add EAX, ESI |
| 7 | EAX | Push the location of the previous result onto the mimic stack. | None |

X+1+Y

| Java Byte Code | Comments |
| --- | --- |
| iload_1 | Push X |
| iconst_1 | Push 1 |
| iadd | Add X+1 |
| iload_2 | Push Y |
| iadd | Add (X+1)+Y |

Figure 6

| Native IA32 Code | Comments |
|---|---|
| Push X | Push X onto Stack |
| Redundant { Push 1 | Push 1 onto Stack |
| Pop EAX | Pop 1 off Stack |
| Add [ESP], EAX | Add 1 to X on Stack |
| Redundant { Push Y | Push Y onto Stack |
| Pop EAX | Pop Y off Stack |
| Add [ESP], EAX | Add Y to (X+1) on Stack |

Figure 7

| Native IA32 Code | Comments |
|---|---|
| Move EAX, X | Put X into EAX Register |
| Add EAX, 1 | Add 1 |
| Add EAX, ESI | Add Y (Stored in ESI Register) |

*Figure 9*

| Step | Mimic Stack | Action | Code Generated |
|---|---|---|---|
| 0 | (empty) | Initial State | None |
| 1 | Var (X) | Push the location of variable X onto the mimic stack in response to iload_1 instruction. | None |
| 2 | Immediate(1) / Var (X) | Push the constant value location onto the mimic stack in response to the iconst_1 instruction. | None |
| 3 | (empty) | Pop the two values on the top of the mimic stack and generate the code to add them, in response to the iadd instruction. | Move EAX, X / Add EAX, Const1 |
| 4 | EAX | Push the location of the previous result onto the mimic stack. | None |
| 5 | ESI / EAX | Push the location of variable Y onto the mimic stack in response to the iadd instruction. | None |
| 6 | (empty) | Pop the two values from the top of the mimic stack and generate code to add them, in response to the iadd instruction. | Add EAX, ESI |
| 7 | EAX | Push the location of the previous result onto the mimic stack. | None |

METHOD FOR FAST TRANSLATION OF JAVA BYTE CODES INTO EFFICIENT NATIVE PROCESSOR CODE

RELATED INVENTIONS

The present invention is related to application Ser. No. 09/087,129 filed May 29, 1998 and application Ser. No. 09/087,349 filed May 29, 1998. In particular, the present invention relates to a method of quickly translation Java Byte Codes into efficient native processor code ready for execution.

FIELD OF THE INVENTION

The present invention relates to the field of computer software optimization. In particular, the present invention relates to a method of quickly translation Java Byte Codes into efficient native processor code ready for execution.

BACKGROUND OF THE INVENTION

Most computer programs exist as compiled object code. The compiled object code is designed to operate only on one particular operating system running on one particular computer processor architecture. To distribute a program for several different computer architectures the original source code must be compiled into object code for each different computer processor architecture and each different operating system.

To create a highly portable programming environment, Sun Microsystems, Inc. introduced Java. Java is an object oriented programming language that is compiled from a well-defined source code into Java byte codes. The Java byte codes are designed to execute on a "Java Virtual Machine." A Java Virtual Machine is not an actual hardware platform. Instead, a Java Virtual Machine is a low level software emulator that can be implemented on many different computer processor architectures and under many different operating systems. Thus, a single compiled Java program can be distributed to any computer processor architecture and operating system that has a Java Virtual Machine implementation available. Therefore, a programmer can write a single Java program and the program will run on many different computer platforms.

Early Java Virtual Machines were implemented as interpreters. In a Java interpreter, each Java byte code is examined and a corresponding operation is performed in the Java Virtual Machine. Although Java byte code interpreters achieve the goal of having a portable programming environment, Java interpreters suffer from slow performance.

To improve the performance of Java Virtual machines, Java compilers were created. Java compilers translate the Java byte codes into native computer processor instructions for the particular computer architecture that the Java Virtual Machine is running on. Then, the computer processor runs the Java program by directly running the compiled native code. Such compiled Java programs execute much faster than Java programs that are executed using a Java interpreter.

In many applications Java programs are distributed in real time across a computer network. For example, a user may download a Java program from a server into a local client computer system. The user then typically wishes to immediately execute the downloaded Java program. To provide an immediate response to the user, a Java byte code compiler immediately compiles the Java program into native processor code. This technique is known as "Just-In-Time" compiling.

Just-In-Time compilation must be performed very quickly to prevent user frustration. Therefore, Just-In-Time compilation can not use computationally expensive techniques to optimize the generated native processor code. Instead, Just-In-Time compilers must generate the best possible code during one or two passes through the source code. It would therefore be desirable to have a compiler that generates high quality object code with a short compile time.

SUMMARY OF THE INVENTION

A method of translating operand stack based code into native processor code is disclosed. The method of the present invention operates by pushing operand stack values onto a compile time "mimic" stack. When an instruction operates on a value pushed onto the mimic stack, native processor code is generated.

Other objects, features, and advantages of present invention will be apparent from the accompanying drawings and from the detailed description that follows below.

BRIEF DESCRIPTION OF THE DRAWINGS

The objects, features and advantages of the present invention will be apparent to one skilled in the art, in view of the following detailed description in which:

FIG. 6 illustrates an inefficient Intel x86 Architecture code sequence that implements the Java byte code of FIG. 4.

FIG. 7 illustrates an efficient Intel x86 Architecture code sequence that implements the Java byte code of FIG. 4.

FIG. 9 lists a set of steps that describes how the method of the present invention generates the efficient code of FIG. 7 from the Java byte code example of FIG. 4.

DETAILED DESCRIPTION OF THE PREFERRED EMBODIMENT

A method and apparatus for quickly translating stack based code into native processor code is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to Java byte codes and the Intel x86 Architecture processor. However, the same techniques and teachings can easily be applied to translating other types of object code to other types of processors.

Java Compiling

Java programs (also known as Java class files) are often distributed in a computer network environment. For example, an Internet World-Wide-Web (WWW) site may store a Java class file consisting of Java byte codes. To run such a Java class file in a computer network environment, a user first accesses a computer server to download the desired Java class file into a client computer system. The client computer system then executes the downloaded Java class file.

To improve execution time, Java byte codes can be translated into native processor code before execution. This is known as Just-In-Time compiling.

Figure 1:
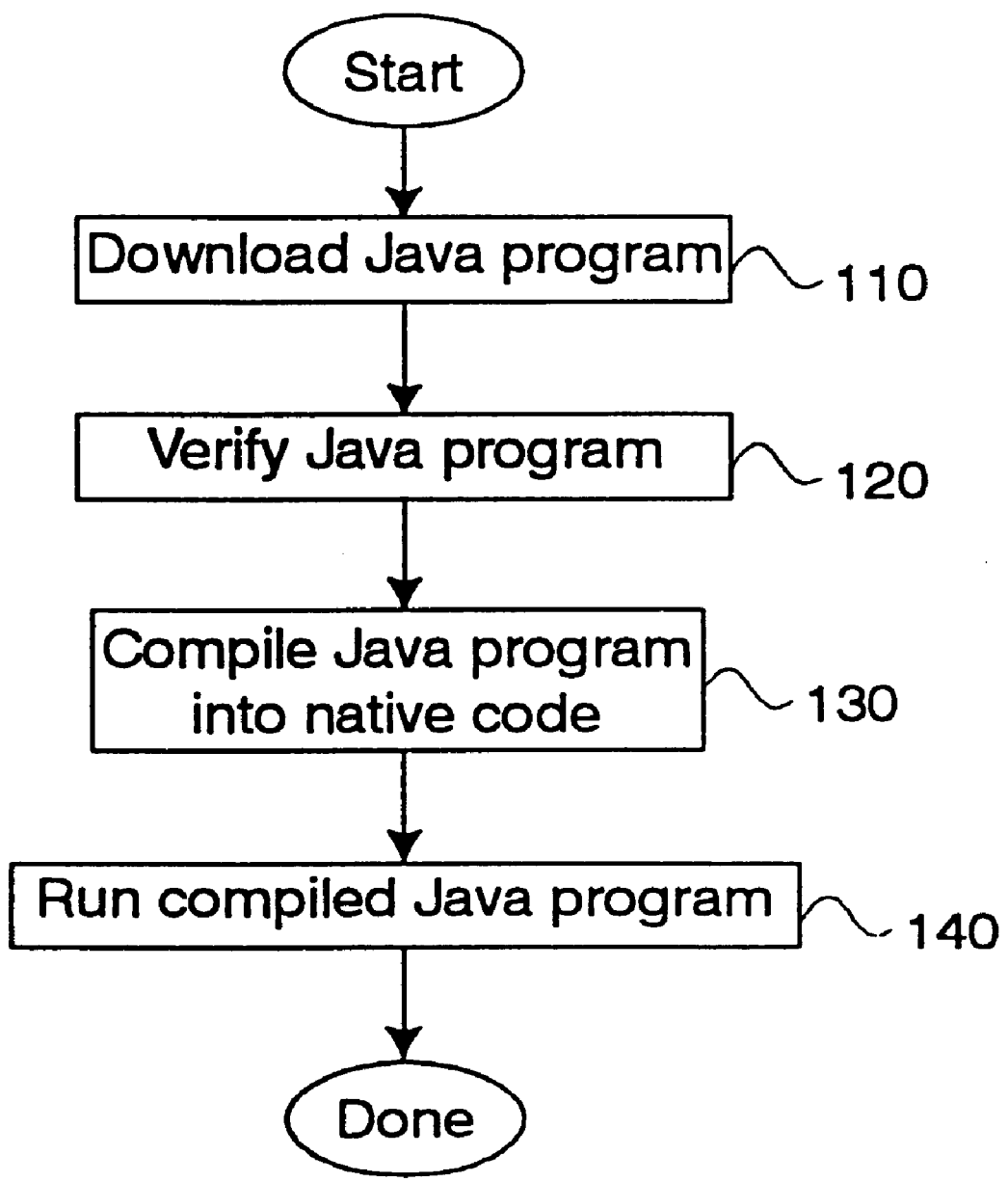
FIG. 1 illustrates a flow diagram that list the steps of downloading, compiling, and running a Java program in a Java Virtual Machine that compiles the code before execution.
Figure 2:
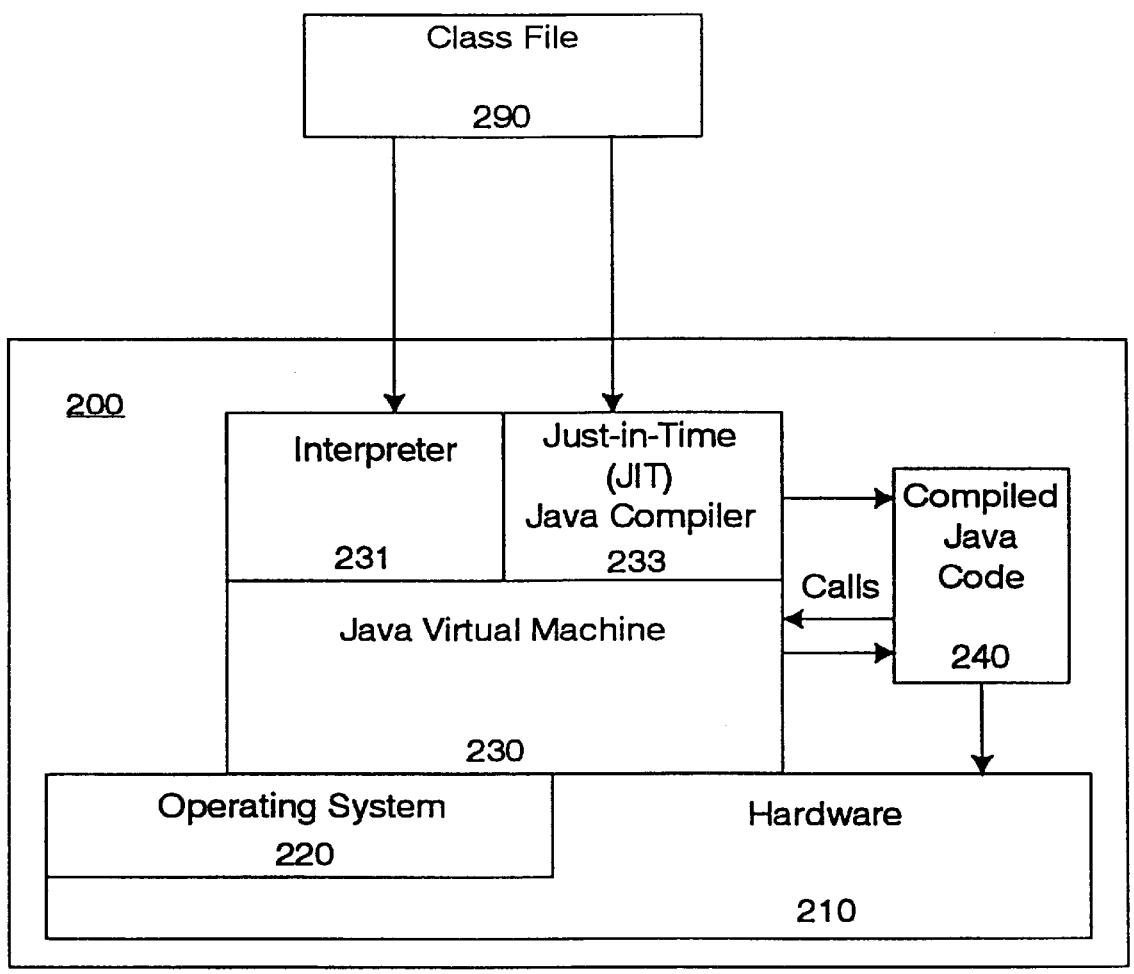
FIG. 2 illustrates a block diagram of a Java Virtual Machine on a client computer system.

An example of compiling and running a Java class file in a computer network environment is provided with reference to FIG. 1 and FIG. 2. FIG. 1 illustrates the steps performed in downloading, compiling, and executing a Java program. FIG. 2 illustrates, in block diagram form, the elements of a client computer system equipped to compile Java class files.

To run a Java class file in a computer network environment, a user first accesses a computer server and downloads the desired Java class file into a client computer system as stated in step 110 of FIG. 1. FIG. 2 illustrates a block diagram of a client computer system that can interpret a Java class file. In client computer system 200, the computer hardware 210 is controlled by an operating system 220. The client computer system 200 includes a Java Virtual Machine 230 implementation for running Java class files. The Java Virtual Machine 230 running on client computer system 200 relies on services from the operating system 220 and the underlying computer hardware 210.

After the Java class file has been downloaded, then the Java class file passed to the Java Virtual machine 230 in the client computer system 200. The Java Virtual machine 230 first verifies the Java class file at step 120. The verification of the Java class file ensures that the program will not cause security violations nor will it harm computer system resources.

After verification of the Java class file, a Just-In-Time Java compiler 233 compiles the Java class file at step 130. Specifically, the Just-In-Time Java compiler 233 compiles the Java byte codes into native code for the processor of client computer system 200. Referring to FIG. 2, when a Java class file has been processed by the Just-In-Time Java compiler 233, the Just-In-Time Java compiler 233 creates compiled Java code 240. The compiled Java code 240 is then directly executed by the computer hardware 210 at step 140. To maintain the state of the Java Virtual machine 230, the compiled Java code 240 makes calls into the Java Virtual machine 230.

Java Operand Stack

The Java Virtual machine is an operand stack based system. Specifically, the Java Byte Codes describe expressions by pushing operands onto an operand stack and then issuing stack operations. The operations pop operands off the operand stack, perform the operation, and then push the result back onto the operand stack.

Figures 3, 4, 5:
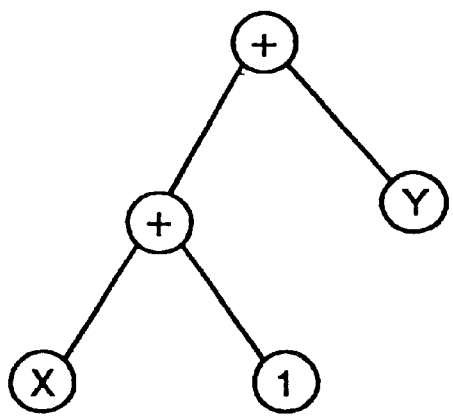
FIG. 3 illustrates a simple mathematical expression.
FIG. 4 lists a Java byte code sequence for the mathematical expression of FIG. 3.
FIG. 5 illustrates one possible intermediate representation of the expression of FIG. 3.

For example, FIG. 3 illustrates a simple mathematical expression (X+1+Y). The Java Byte code of FIG. 4 represents the expression of FIG. 3 in an operand stack manner wherein operands are pushed onto an operand stack. Referring to FIG. 4, the first two instructions ("iload_1" and "iconst_1") push integer values onto the operand stack. The next instruction ("iadd") adds the two values on the top of the operand stack and places the result back onto the operand stack. The next instruction ("iload_2") pushes yet another integer onto the operand stack. The last instruction ("iadd") adds together the two values on the top of the operand stack and pushes the result back onto the operand stack. More information about the Java operand stack can be found in the book *The Java Language Specification* by J. Gosling, B. Joy and G. Steele.

Expression Analysis

Traditional Compilers evaluate expressions by first generating an intermediate representation and then generating optimized code based upon the intermediate representation. For example, FIG. 5 illustrates a typical expression tree that would be generated by a compiler that is compiling the expression of FIG. 3. The compiler would then use the expression tree to generate optimized code that evaluates the expression.

However, in a Just-In-Time compiler environment the compilation time is part of the program execution time. Thus, computationally intensive tasks such as generating an intermediate expression representation are not ideal for Just-In-Time compilers since the time to generate and use the intermediate expression will be part of the program execution time.

One method of quickly generating code for analyzing expressions is to emulate the Java operand stack using the stack mechanism of the native processor. Thus, each Java operand that is pushed onto the Java operand stack is pushed onto the stack of the native processor. Then, when an operation is encountered, the operands are popped off the native processor stack and the operation is performed using an instruction or code sequence of the native processor.

FIG. 6 illustrates Intel x86 Architecture code that evaluates the expression of FIG. 3 using the native stack as the operand stack. Referring to the first two lines of code in FIG. 6, the code pushes the two operands ("X" and "1") onto the x86 Architecture stack. Then, at the third instruction, a first operand ("1") is popped off the x86 Architecture stack and placed into a register. The fourth instruction adds the value on the top of the x86 Architecture stack ("X") with the operand that was just popped off of the x86 Architecture stack and places the result on the x86 Architecture stack. The fifth instruction in the code of FIG. 6 pushes a third operand ("Y") onto the x86 Architecture stack. The sixth instruction pops an operand ("Y") off the x86 Architecture stack and places it into a register. The seventh instruction adds the value on the top of the x86 Architecture stack ("X+1") with the operand that was just popped off of the x86 Architecture stack ("Y") and places the result ("X+1+Y") on the x86 Architecture stack. Details on the x86 instruction set can be found in the "Pentium Processor Family Developer's manual, Volume 3: Architecture and Programming Manual" from Intel Corporation of Santa Clara, Calif.

By examining the code of FIG. 6, it can be seen that the code is redundant. For example, there are two sequences where a PUSH instruction is immediately followed by a POP instruction. FIG. 7 illustrates a second Intel x86 Architecture code sequence that analyzes the expression of FIG. 3 in a much more efficient manner. Specifically, only three instructions are required in the efficient coding of FIG. 7. Therefore, a new method of quickly generating native code based upon the Java stack operand is needed.

The Mimic Stack

To quickly generate native processor code from operand stack based source code, the present invention introduces a "mimic stack." The mimic stack is a stack that the compiler uses to keep track of operands that have been pushed onto the operand stack by the operand stack based source code.

When an operand stack operation is encountered then the values on the mimic stack are popped off and code is generated which operates on the operands popped off the mimic stack. The location of the operation result is then pushed onto the mimic stack. Thus, the mimic stack emulates the operation of the Java run-time operand stack.

Figure 8:
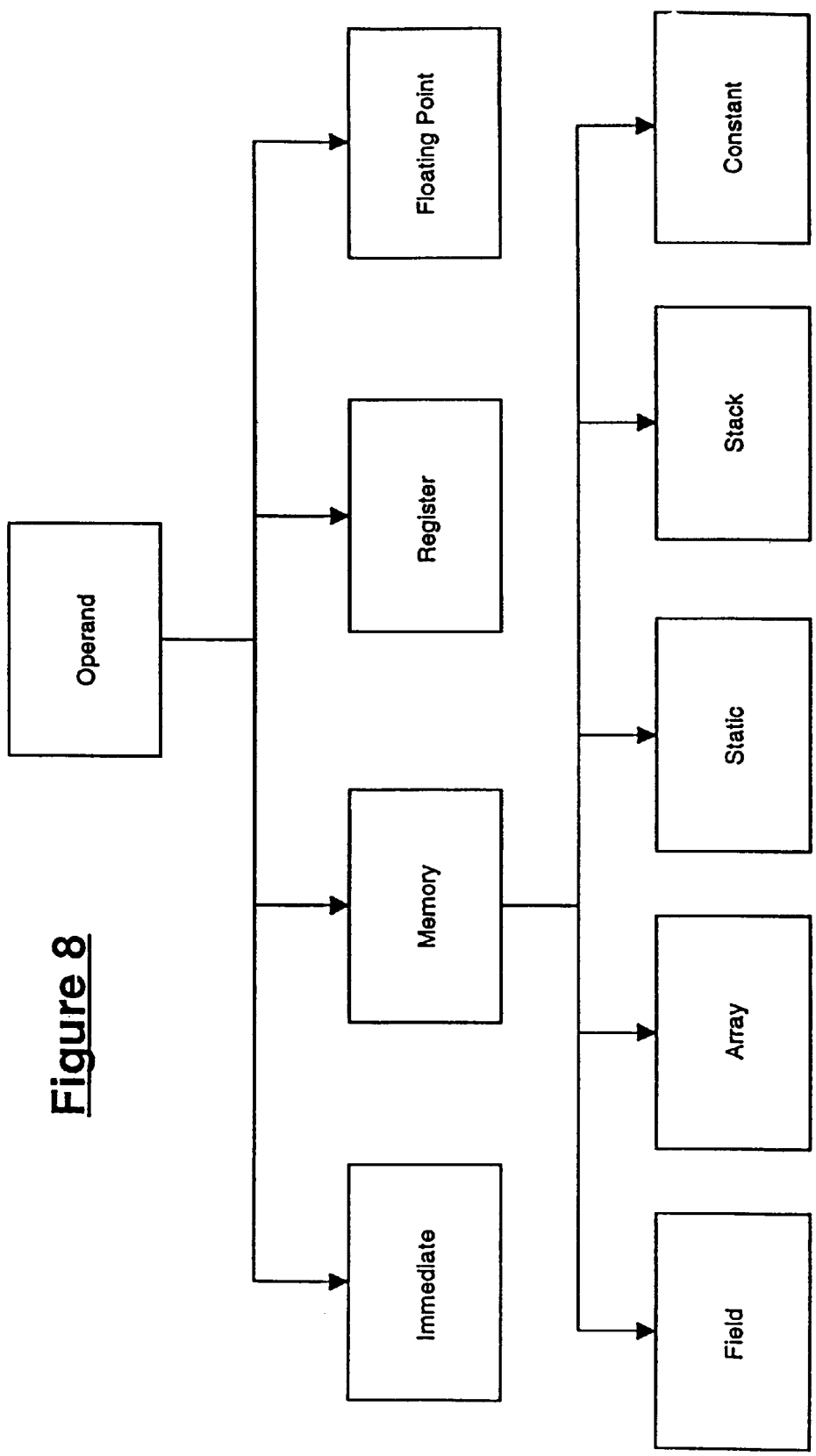
FIG. 8 graphically illustrates a hierarchy of operand types that may be used with the mimic stack of the present invention.

The operands that may be pushed onto the mimic stack are modeled in a C++ hierarchy as illustrated in FIG. 8. As illustrated in FIG. 8, there are four main types of operands: (1) register operands (Register), which are values in physical integer registers and directly addressable by most integer compute instructions, (2) immediate operands (Immediate), which are constant values that can be folded into the immediate fields of integer compute instructions, (3) memory operands (Memory), which are values in memory that can be folded into floating-point or integer compute instructions using one of IA32's memory addressing modes, and (4) floating point operands (FP), which are values of the IA32 floating-point register stack. The memory operands are further classified according to the kind of data being accessed: (1) object field references (Field), which use the offset addressing mode (base register plus constant offset), (2) array elements (Array), which use the indexed addressing mode (base register plus scaled index register), (3) static class variables that are not declared as final (Static), which use the absolute addressing mode, (4) floating point constants and static class variables that are declared as final (Constant), which also use the absolute addressing mode (IA32 floating-point instructions do not have an immediate form), and (5) stack frame locations (Stack), which use the offset addressing with either the stack or frame pointer register as the base.

The stack frame locations refer to variables that exist in the stack frame that is associated with an active method. The stack frame locations are used for spilling and for those local variables that are not allocated a register. When referring to stack based operands, the JIT compiler eliminates the frame pointer in most cases so that most Stack operands use the stack pointer register as the base register. Frame pointer elimination frees up an additional register for use by the global register allocator, and reduces the number of instructions executed in a method's prolog.

As set forth above, when an operand stack operation byte code is detected, the JIT code selector first pops the corresponding source operands from the mimic stack, and then tries to fold the source operands into the compute instruction selected for the stack operation byte code. If the attempt is successful, then the folded compute instruction is selected. Otherwise, if an operand O cannot be folded into the compute instruction, then the JIT code selector selects an instruction that loads O into a scratch register R, and then generates a compute instruction that uses R as the source operand. The result of the compute instruction (which often is a register) is pushed onto the mimic stack to make it available for folding into subsequent instructions.

The JIT code selector performs several simple optimizations during code selection. First, if one of the operands of a compute instruction is an Immediate or Constant operand, then the JIT code selector attempts to perform strength reduction (for multiply, divide, and mod operators) or constant folding on the compute instruction. Second, the JIT code selector detects compare followed by branch byte code sequences so that it can generate the corresponding native processor compare and branch instruction sequence. Third, the JIT code selector performs redundant load-after-store elimination by tracking values loaded into registers. Specifically, this optimization replaces the use of a memory operand with the use of a register that already contains the memory value.

To illustrate how the present invention uses the mimic stack to quickly generate efficient code, an example of code generation based upon the expression of FIG. 3 as described by the Java byte code of FIG. 4. The end result of the native processor code generation will be the efficient Intel x86 Architecture code illustrated in FIG. 7. The example will follow several steps as illustrated in FIG. 9.

Referring to step 0 of FIG. 9, the initial state of the mimic stack is an empty mimic stack. When the first Java byte code of FIG. 4 is encountered (the iload_1 byte code), the JIT compiler pushes the reference to stack frame variable "X" (in this example, local variable "1") onto the mimic stack by pushing the location of variable X onto the mimic stack as illustrated in step 1 of FIG. 9. Next, at step 2, the JIT compiler pushes the constant "1" onto the mimic stack in response to the iconst_1 byte code.

When the JIT compiler encounters the iadd byte code that performs an operation on the operand stack values at step 3, the JIT pops the two values off the mimic stack and generates code to perform the operation. In this example, the JIT code selector generates a "MOVE EAX, X" instruction to loads the "X" variable into a register since the "X" variable currently exists in a memory location. Next, the JIT code selector generates an ADD EAX, const_1" instruction to add the constant "1" to "X". The result of this operation is held in the EAX register. Thus, at step 4, the location of the result (EAX) is pushed onto the mimic stack.

The JIT compiler then proceeds to the next byte code "iload_2." The JIT compiler pushes the location "Y" value onto the mimic stack at step 5 in response to the "iload_2" instruction. In this example, the "Y" variable is stored in the ESI register such that the ESI register is pushed onto the mimic stack.

Next, at step 6, the JIT code generator pops the two values off the mimic stack and generates code to implement the last "iadd" instruction. In this case, the two operand values popped off the mimic stack are stored in registers such that a simple register to register add instruction ("ADD EAX, ESI") is used to implement the add. Finally, at step 7, the result is pushed back onto the mimic stack such that the result will be available for the next operand stack operation.

Intel Architecture Floating Point Considerations

The floating-point (FP) registers of Intel x86 Architecture are organized as a stack wherein a floating-point compute instruction pops one FP operand from the FP register stack (the other FP operand can be a memory operand or another location on the FP register stack) and pushes the FP result onto the FP register stack. This maps perfectly to the Java Virtual Machine's stack-based architecture: whenever an FP operand is popped from the mimic stack, this operand must represent the top of the floating-point register stack. The only complication is that the code selector needs to keep track of the floating-point register stack depth and generate spill code if overflow occurs. The Intel Architecture floating-point register stack has only 8 registers but we have found that none of our applications cause floating-point register stack overflow.

At a call site, the code selector generates spills for those operands on the mimic stack that are live across the call site, since the calling conventions consider the FP stack to be caller-saved. Only those operands that may be killed by the call need to be saved; that is, mimic stack operands that are of type Field, Array, Static, FP, and caller-saved Register;

operands of type Immediate, Constant, Stack, and callee-saved Register do not need to be spilled.

Mimic Stack Consistency

One problem for the JIT code generator is that the Java operand stack can be non-empty at the entry or exit of a basic block. (A basic block of code is a sequence of code between branch instructions.) This condition occurs mainly because of conditional expressions (i.e., question mark colon expressions such as a>b?a:b) that push a value onto the operand stack depending on the outcome of an expression. This may cause a problem since the code generator must guarantee that the operands on the mimic stack are the same at the merge point of two paths.

To guarantee that mimic stack operands are the same at the merge point of several paths, all values that remain on the mimic stack at the end of a basic block are spilled to canonical spill locations in the stack frame. Similarly, if the Java operand stack depth is non-zero at a branch target, then for each Java operand stack location that contains a value, the corresponding mimic stack location is initialized to its canonical spill location. To be sure that the stack frame has enough room to store the operand stack spill, a prepass phase is used to compute the Java operand stack depth.

The foregoing has described a method for quickly translating operand stack based code into efficient native processor code. It is contemplated that changes and modifications may be made by one of ordinary skill in the art, to the materials and arrangements of elements of the present invention without departing from the scope of the invention.

We claim:

1. A method of translating operand stack based code into native processor code, said method comprising:

pushing at least one value onto a compile time mimic stack which emulates an operand stack, the compile time mimic stack being independent of a stack mechanism of the native processor and independent of general purpose registers of the native processor; and generating native processor code upon encountering an operand stack instruction that operates on said value pushed onto the compile time mimic stack.

2. The method as claimed in claim 1 wherein said generating native processor code comprises generating a native processor instruction that performs the operation of said instruction that operates on said value pushed onto the compile time mimic stack.

3. The method as claimed in claim 2 wherein the result of said native processor instruction is pushed onto said compile time mimic stack.

4. The method as claimed in claim 1 wherein pushing said at least one value onto a compile time mimic stack comprises pushing the location of a variable onto said compile time mimic stack when said variable is pushed onto said operand stack in operand stack based code.

5. The method as claimed in claim 1 wherein said at least one value comprises a register.

6. The method as claimed in claim 1 wherein said at least one value comprises a floating point stack value.

7. The method as claimed in claim 1 wherein said at least one value comprises an immediate value.

8. The method as claimed in claim 1 wherein said at least one value comprises a memory location.

9. The method as claimed in claim 8 wherein said memory location comprises a location in a stack frame.

10. The method as claimed in claim 1 wherein said at least one value comprises a constant.

11. The method as claimed in claim 1 wherein generating native processor code comprises moving said at least one value into a register.

12. A computer system comprising:

a storage device having stored therein a routine for translating operand stack based code into native processor code;

a processor coupled to the storage device for executing the routine for translating operand stack based code into native processor code, where:

at least one value is pushed onto a compile time mimic stack which emulates an operand stack, the compile time mimic stack being independent of a stack mechanism of the native processor and independent of general purpose registers of the native processor; and native processor code is generated upon encountering an operand stack instruction that operates on the value pushed onto the compile time mimic stack.

13. The system of claim 1, where generating the native processor code comprises generating a native processor instruction that performs the operation of the instruction on the value pushed onto the compile time mimic stack.

14. The system of claim 12, wherein the result of the native processor instruction is pushed onto the compile time mimic stack.

15. The system of claim 12, wherein pushing the at least one value onto a compile time mimic stack comprises pushing the location of a variable onto the compile time mimic stack when the variable is pushed onto the operand stack in operand stack based code.

16. The system of claim 12, wherein the at least one value comprises a register.

17. The system of claim 12, wherein the at least one value comprises a floating point stack value.

18. The system of claim 12, wherein the at least one value comprises an immediate value.

19. The system of claim 12, wherein the at least one value comprises a memory location.

20. The system of claim 19, wherein the memory location comprises a location in a stack frame.

21. The system of claim 12, wherein the at least one value comprises a constant.

22. The system of claim 12, wherein generating native processor code comprises moving the at least one value into a register.

23. A method of translating operand stack based code into native processor code, said method comprising:

detecting an instruction that pushes a first value onto an operand stack in said operand stack based code and responding by delaying generation of native processor code until an operand stack base code instruction is encountered that operates on the operand stack and pushing a location of said first value onto a compile time mimic stack which emulates the operand stacks the compile time mimic stack being independent of a stack mechanism of the native processor and independent of general purpose registers of the native processor; and detecting an instruction that operates on said first value pushed onto the operand stack and responding by generating code that operates on said first value using said location pushed onto said compile time mimic stack.

24. The method as claimed in claim 23 wherein generating said native processor code comprises generating a native processor instruction that performs the operation of said instruction that operates on said first value pushed onto the compile time mimic stack.

25. The method as claimed in claim 24 wherein the result of said native processor instruction is pushed onto said compile time mimic stack.

26. The method as claimed in claim 23 wherein one of said operand stack values comprises a register.

27. The method as claimed in claim 23 wherein one of operand stack values comprises a floating point stack value.

28. The method as claimed in claim 23 wherein one of operand stack values comprises an immediate value.

29. The method as claimed in claim 23 wherein one of operand stack values comprises a memory location.

30. The method as claimed in claim 23 wherein a memory location of said first value comprises a constant.

31. The method as claimed in claim 23 wherein a memory location of said first value comprises a location in a stack frame.

32. The method as claimed in claim 23 wherein generating code that operates on said first value using said location pushed onto said compile time mimic stack comprises folding the access to the first location into an arithmetic instruction.

33. A computer system comprising:
    a storage device having stored therein a routine for translating operand stack based code into native processor code;
    a processor coupled to the storage device for executing the routine for translating operand stack based code into native processor code, where:
        an instruction that pushes a first value onto an operand stack in said operand stack based code is detected and, in response to detecting the instruction, generation of native processor code is delayed until an operand stack base code instruction is encountered that operates on the operand stack and a location of said first value is pushed onto a compile time mimic stack which emulates the operand stack, the compile time mimic stack being independent of a stack mechanism of the native processor and independent of general purpose registers of the native processor; and
        an instruction that operates on said first value pushed onto the operand stack is detected and in response to detecting the instruction code is generated that operates on said first value using said location pushed onto said compile time mimic stack.

34. The system of claim 33, wherein generating said native processor code comprises generating a native processor instruction that performs the operation of said instruction that operates on said first value pushed onto the compile time mimic stack.

35. The system as claimed in claim 34 wherein the result of said native processor instruction is pushed onto said compile time mimic stack.

36. The system as claimed in claim 33 wherein one of said operand stack values comprises a register.

37. The system as claimed in claim 33 wherein one of operand stack values comprises a floating point stack value.

38. The system as claimed in claim 33 wherein one of operand stack values comprises an immediate value.

39. The system as claimed in claim 33 wherein one of operand stack values comprises a memory location.

40. The system as claimed in claim 33 wherein a memory location of said first value comprises a constant.

41. The system as claimed in claim 33 wherein a memory location of said first value comprises a location in a stack frame.

42. The system as claimed in claim 33 wherein generating code that operates on said first value using said location pushed onto said compile time mimic stack comprises folding the access to the first location into an arithmetic instruction.

43. A machine-readable medium having stored thereon data representing sequences of instructions, the sequences of instructions which, when executed by a processor translate operand stack based code into native processor code by:
    pushing at least one value onto a compile time mimic stack which emulates an operand stack, the compile time mimic stack being independent of a stack mechanism of the native processor and independent of general purpose registers of the native processor; and
    generating native processor code upon encountering an operand stack instruction that operates on said value pushed onto the compile time mimic stack.

44. The machine-readable medium as claimed in claim 43 wherein said generating native processor code comprises generating a native processor instruction that performs the operation of said instruction that operates on said value pushed onto the compile time mimic stack.

45. The machine-readable medium as claimed in claim 44 wherein the result of said native processor instruction is pushed onto said compile time mimic stack.

46. The machine-readable medium as claimed in claim 43 wherein pushing said at least one value onto a compile time mimic stack comprises pushing the location of a variable onto said compile time mimic stack when said variable is pushed onto said operand stack in operand stack based code.

47. The machine-readable medium as claimed in claim 43 wherein said at least one value comprises a register.

48. The machine-readable medium as claimed in claim 43 wherein said at least one value comprises a floating point stack value.

49. The machine-readable medium as claimed in claim 43 wherein said at least one value comprises an immediate value.

50. The machine-readable medium as claimed in claim 43 wherein said at least one value comprises a memory location.

51. The machine-readable medium as claimed in claim 50 wherein said memory location comprises a location in a stack frame.

52. The machine-readable medium as claimed in claim 43 wherein said at least one value comprises a constant.

53. The machine-readable medium as claimed in claim 43 wherein generating native processor code comprises moving said at least one value into a register.

54. A machine-readable medium having stored thereon data representing sequences of instructions, the sequences of instructions which, when executed by a processor translate operand stack based code into native processor code by:
    detecting an instruction that pushes a first value onto an operand stack in said operand stack based code and responding by delaying generation of native processor code until an operand stack base code instruction is encountered that operates on the operand stack and pushing a location of said first value onto a compile time mimic stack which emulates the operand stack the compile time mimic stack being independent of a stack mechanism of the native processor and independent of general purpose registers of the native processor; and
    detecting an instruction that operates on said first value pushed onto the operand stack and responding by generating code that operates on said first value using said location pushed onto said compile time mimic stack.

55. The machine-readable medium as claimed in claim 54 wherein generating said native processor code comprises generating a native processor instruction that performs the operation of said instruction that operates on said first value pushed onto the compile time mimic stack.

56. The machine-readable medium as claimed in claim 55 wherein the result of said native processor instruction is pushed onto said compile time mimic stack.

57. The machine-readable medium as claimed in claim 54 wherein one of said operand stack values comprises a register.

58. The machine-readable medium as claimed in claim 54 wherein one of operand stack values comprises a floating point stack value.

59. The machine-readable medium as claimed in claim 54 wherein one of operand stack values comprises an immediate value.

60. The machine-readable medium as claimed in claim 54 wherein one of operand stack values comprises a memory location.

61. The machine-readable medium as claimed in claim 54 wherein a memory location of said first value comprises a constant.

62. The machine-readable medium as claimed in claim 54 wherein a memory location of said first value comprises a location in a stack frame.

63. The machine-readable medium as claimed in claim 54 wherein generating code that operates on said first value using said location pushed onto said compile time mimic stack comprises folding the access to the first location into an arithmetic instruction.

* * * * *

UNITED STATES PATENT AND TRADEMARK OFFICE
CERTIFICATE OF CORRECTION

PATENT NO. : 6,292,935 B1
DATED : September 18, 2001
INVENTOR(S) : Lueh et al.

It is certified that error appears in the above-identified patent and that said Letters Patent is hereby corrected as shown below:

Column 8,
Line 55, delete "stacks", insert -- stack, --.

Signed and Sealed this

Third Day of September, 2002

Attest:

Attesting Officer

JAMES E. ROGAN
Director of the United States Patent and Trademark Office